May 16, 1961   F. B. KENNELL   2,984,820
BURGLAR ALARM FOR AUTOMOBILES
Filed Jan. 24, 1958   2 Sheets-Sheet 1

Franklin B. Kennell
INVENTOR.

BY *O'Brien*
*and Harvey B. Jacobson*
Attorneys

May 16, 1961  F. B. KENNELL  2,984,820
BURGLAR ALARM FOR AUTOMOBILES
Filed Jan. 24, 1958  2 Sheets-Sheet 2
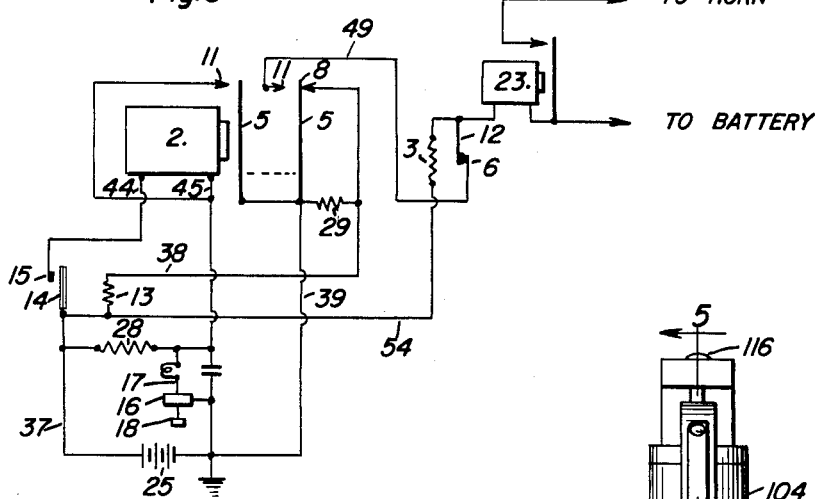
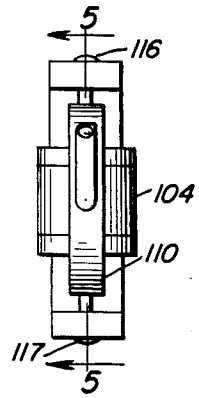
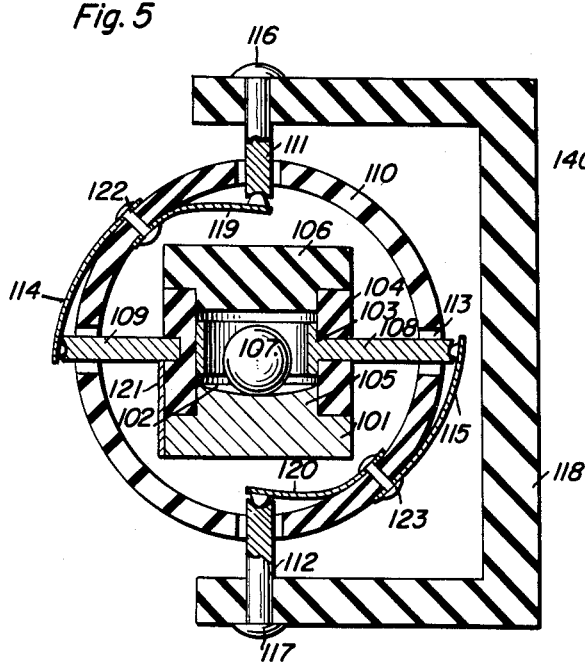
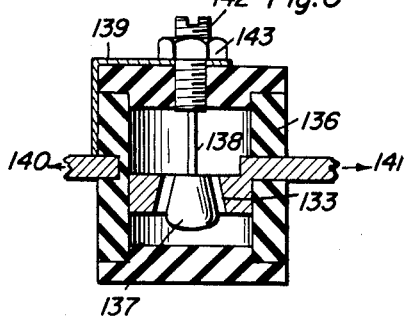
Franklin B. Kennell
INVENTOR.

United States Patent Office 2,984,820
Patented May 16, 1961

2,984,820
BURGLAR ALARM FOR AUTOMOBILES
Franklin B. Kennell, 151 Northern Blvd., Riverhead, N.Y.
Filed Jan. 24, 1958, Ser. No. 711,006
8 Claims. (Cl. 340—65)

This invention relates generally to burglar alarms and more particularly to a burglar alarm system to protect parked motor vehicles and particularly automobiles.

A principal object of this invention is to provide a burglar alarm system for an automobile which will actuate an audible and/or visual warning when anyone attempts to steal the automobile.

Another object of this invention is to provide a burglar alarm system for an automobile which includes warning devices actuated when the vehicle is struck by another vehicle.

A still further object of this invention is to provide an automobile burglar alarm system which will reduce the likelihood of the theft of any parts or accessories of the automobile while the automobile is unattended.

A still further object of this invention is to provide an automobile burglar alarm system which depends upon any momentary acceleration of the automobile, such as might be caused by jarring the vehicle, for actuation of the warning devices.

A still further object of this invention is to provide novel acceleration sensitive switch means for triggering an electrical circuit to actuate warning devices.

A still further object of this invention is to provide an acceleration sensitive switch that is independent of the position or angle at which the automobile is parked.

In accordance with the above stated objects, below is described an automobile burglar alarm system for installation in any conventional automobile to be used in conjunction with the existing electrical circuitry. The invention contemplates the use of a capacitor to be connected across the battery terminals of an automobile and to be charged therefrom through a resistor. Further included in the circuit is a heating element which closes a pair of normally open contacts, after a predetermined time delay, to place the circuit in an alert condition whereby it will actuate a warning device upon the acceleration of any portion of the automobile. The time-delay is included in the circuit so that after the operator of the automobile has closed the main circuit switches prior to emerging from the automobile, the burglar alarm will not be sensitive to acceleration until after the doors of the vehicle are closed. The novel acceleration sensitive switch is able to detect any acceleration of the unattended vehicle and is electrically connected to discharge the above mentioned capacitor causing certain relays to actuate the warning devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a still further circuit which eliminates some relays utilized in the prior two circuits;

Figure 4 is an elevational side view of one embodiment of the novel acceleration sensitive switch;

Figure 5 is a sectional view of the switch taken substantially along the plane 5—5 of Figure 4; and Figure 6 is a sectional view of another embodiment of the acceleration sensitive switch.

Figure 1:
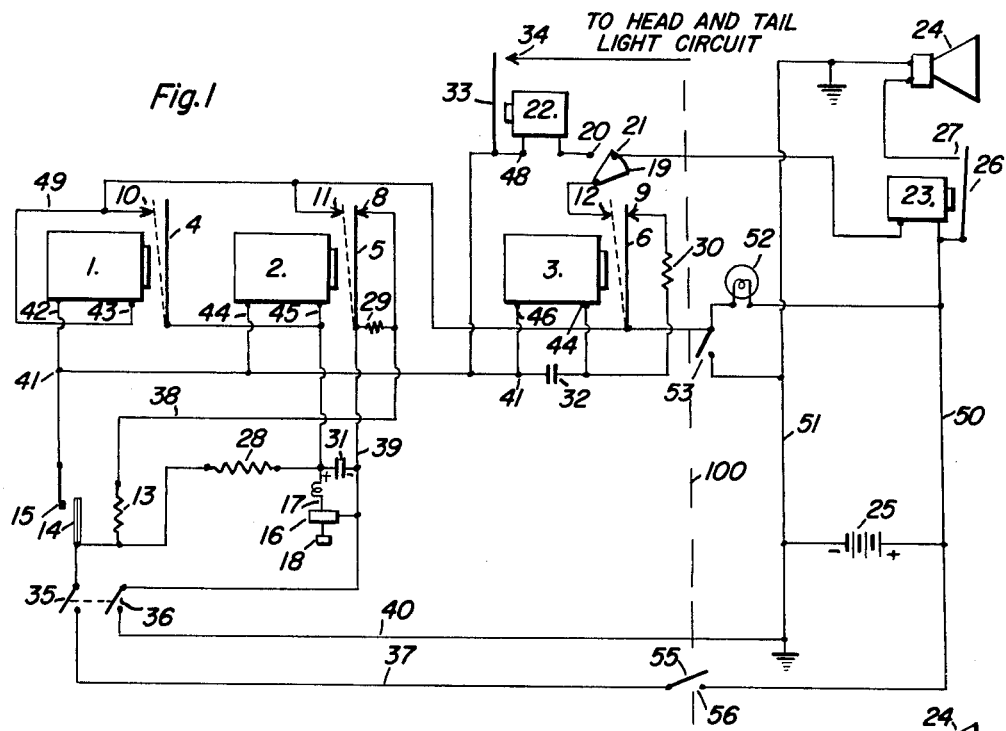
Figure 1 shows a circuit of one form of the invention to be utilized in an automobile having one type of an electrical circuit.

With continuing reference to the drawings, numerals 1, 2 and 3 in Figure 1 represent three magnetic relays of the single-pole double-throw type. The relays have core pieces thereon which are adapted to attract armatures 4, 5 and 6 of relays 1, 2 and 3 respectively. In Figure 1 the armatures are shown as solid lines in their normally unenergized position. The energization of the relays will draw the armatures to the dotted positions shown. Armature 4 is adapted to contact fixed contact 10 in its energized position. Armature 5 is adapted to contact either of contacts 8 and 11. Armature 6 is adapted to contact either of contacts 9 and 12.

Elements 13, 14 and 15 represent respectively the heating element, the bimetallic strip, and fixed contact. The heating element 13 is situated proximate the bimetallic strip 14 so that when the element 13 is heated sufficiently, the strip 14 will bend electrically contacting contact 15.

An acceleration sensitive switch is shown in its very basic form including a bare wire 17 which carries at the terminal end thereof a weight 18 as a pendulum. The bare electrical wire 17 extends through an electrically conductive ring 16 which is connected to lead 39. Electrically connected between one side of heating element 13 and lead 39 is a resistor 28 and a capacitor 31. The electrically conductive bare wire 17 is electrically connected between the resistor 28 and the capacitor 31. It should therefore be apparent that the wire 17 and ring 16 form a discharge path for the capacitor 31 when weight 18 causes wire 17 to electrically contact ring 16.

A battery 25, the conventional automobile battery, is intended to energize the entire circuit through a switch having a movable contact 55 and a fixed contact 56. This switch is intended to be mounted within the door of an automobile and may be actuated by the door lock mechanism normally present therein and contacts 55 and 56 will be electrically connected when the automobile doors are locked. A double-pole single-throw switch having contacts 35 and 36 is intended to be mounted on the dashboard of an automobile to enable the automobile operator to connect the automobile battery 25 to the remainder of the circuit prior to emerging from the automobile.

An automobile horn 24 is shown grounded at one terminal and actuatable through contact 27 and armature 26 of relay 23 which effectively places the horn 24 across the battery 25 when the relay is energized. A dome light or courtesy light 52 is shown connected across the battery 25 through switch 53. The function of switch 53 in the alarm system is independent of the condition of light 52. That is, whether the light is in good condition or burned out, it does not effect the proper operation of the burglar alarm system. The purpose of this switch will be explained later. It is to be noted that a dotted line 100 intersects the switch carrying contacts 55 and 56. This line has been included in the drawing only to separate the conventional automobile equipment (shown to the right of the dotted line) and the apparatus of this invention (shown to the left of the dotted line) which all may be included within a single box which in turn may be conveniently mounted anywhere in the automobile.

A switch 19, having three positions is shown electrically connected to contact 12. The function of this switch 19 is to supply electrical energy to contact 21 to horn actuating relay 23 or through contact 20 to head and tail light circuit actuating relay 22 or to both switch contacts 20 and 21 simultaneously.

In the operation of this invention, when the alarm is to be put in use, the vehicle operator (before leaving the vehicle) closes the double-pole single-throw switch thereby placing contacts 35 and 36 directly across battery 25. The battery 25 now feeds two complete circuits. Firstly, a current will flow through the heating element 13, conductor 38, contact 8, armature 5, lead 39, and through contact 36 back to the battery. This will cause the heating element 13 to begin heating after which the bimetallic strip 14 will bend to contact fixed contact 15. The time-delay introduced between the time of the initial current flow through the heating element 13 and the contact between 14 and 15 may be arbitrarily determined. It is however, contemplated, that an interval of thirty seconds will provide sufficient time for the occupants of the automobile to emerge therefrom. However, if it is desired that the time-delay be variable subject to the desires of the operator, a variable resistor may be inserted in the heating circuit which includes heating element 13. A second circuit which is completed when the battery 25 is electrically placed across the contacts 35 and 36 includes the resistor 28 and capacitor 31. While the heating element 13 is heating, the capacitor 31 is charging so that it will be fully charged when the bimetallic strip 14 contacts the fixed contact 15. When contacts 14 and 15 close the circuit is in its "alert" condition, that is, in this condition any acceleration of the automobile will energize the warning devices, such as horn 24.

Through contacts 14 and 15 and conductor 41 the positive side of the battery 25 is seen now to be connected to one terminal of each of the coils of the relays at 42, 44, 46 and 48. None of the relay coils, however, are in a closed circuit across the battery 25 and all the armatures therefore remain in the position shown by the solid lines.

In this alert condition, no current will be flowing through the resistor 28 due to the fact that the capacitor 31 has assumed its full charge, that is, the voltage across the capacitor should now equal the battery voltage.

While the circuit is in this alert condition, should the car containing the circuit be accelerated, pushed, bumped, or jarred in any way, it will cause the wire 17 to contact the ring 16 due to the weight 18 hanging from the wire at its lower end stabilizing it. This momentary contact places a short circuited path directly across capacitor 31 immediately dissipating its charge. Though the contact has only been momentary, the capacitor 31 will lose virtually all its charge through the short circuited connection between ring 16 and wire 17 and will therefrom act as a practically non-resistant conductor between the terminal 45 of relay 2 and conductor 39.

After this momentary short circuiting, capacitor 31 again begins to accumulate a charge, due to the much lower impedance of relay coil 2 compared to the resistance 28, the majority of the current flowing from battery 25 into capacitor 31 will pass through relay coil 2 thereby energizing it and moving the armature 5 to its dotted position into contact with contact 11. When the armature 5 contacts contact 11 the lead 49 assumes the voltage of the negative side of battery 25. Therefore, relay coil 1 now having its terminal 43 connected to conduit 49 becomes actuated moving armature 4 into contact with contact 10, thereby shorting the capacitor 31 and connecting terminal 45 of relay coil 2 to conductor 49 and to the negative side of the battery. Both relays 1 and 2 remain energized and said contacts remain closed. Likewise, the battery voltage will be applied across the armature 6, resistance 30 and capacitance 32. The capacitor 32 will then begin to charge receiving virtually all the current through resistor 30. When the capacitor 32 becomes fully charged, the current through resistor 30 will assume the path through relay coil 3, thereby drawing armature 6 to its dotted position into contact with contact 12. Of course, the contact with contact 12 will acuate the warning devices, either the horn or headlights, depending on the switch position of switch 19. When armature 6 assumes its dotted position, the circuit through relay coil 3 is broken which would tend to release armature 6 back to its solid line position. However, the armature 6 is held in its dotted position as long as relay coil 3 provides a discharge path for capacitor 32. When the charge on capacitor 32 dissipates through relay coil 3, the armature 6 will revert back to its solid position, and capacitor 32 will begin to charge again. It will therefore be seen, that the warning devices will be actuated intermittently through relay coils 22 and 23.

The cyclic rate of operation and percent dwell of relay 3 is determined by the values assigned to the resistance 30, capacitor 32 and relay coil 3.

When the armature 5 moved to its dotted position so that it contacted contact 11 the heating circuit through heating element 13, contact 8 and armature 5 was broken. When the contact between armature 5 and contact 8 was broken, the heating element 13 formed a series connection with resistance 29. This action caused a decrease of current flowing through the heating element and the slow cooling of the heating element 13. Consequently, after the expiration of this predetermined time-delay bimetallic strip 14 is cooled sufficiently and assumes its normal position opening the electrical connection between strip 14 and contact 15. When this connection between the contact 15 and strip 14 opens, the positive side of the battery 25 is seen now to be disconnected from conductor 41 and therefore from the terminals 42, 44, 46 and 48 of the coils of their respective relays 1, 2, 3, and 22. None of these relay coils therefore is now in a closed circuit across the battery 25 and all relays become de-energized and release their respective armatures to fall back to their original or solid line positions. The warning signal of the horn 24 or head and tail lights of course cease. It therefore can be seen, that the intermittent actuation of the warning devices will continue for a predetermined duration depending on the resistance of resistor 29 which controls the cooling of heating element and bi-metallic strip 14. Of course, resistor 29 may be made variable, if such complexity be desired.

Furthermore, when armature 4 broke contact with contact 10 the short circuit across capacitor 31 was lifted and it again being in series with resistor 28 across battery 25 accumulates a full charge equaling the voltage of the battery 25. When armature 5 broke contact with contact 11 the conductor 49 no longer assumed the potential of the negative side of battery 25. When armature 5 again contacted contact 8 resistor 29 was again shorted out of the circuit of heating element 13, which again heats, heating the bi-metallic strip 14 and causing it again to make contact with contact 15. The circuit again assumes its alert condition subject to the triggering by the acceleration sensitive switch.

When the operator wishes to re-enter the vehicle he may do so without actuating the alarm by unlocking the door with the regular car key, as this opens the contacts 55 and 56, which are actuated by the door lock mechanism as previously stated, thereby disconnecting the alarm system from the battery 25.

Part 52 of Figure 1 is the dome light bulb or courtesy light which is switched on by the door switch 53 when the door is opened. Switch 53 being normally opened when the door is closed. When the door is opened the door switch 53 closes, thereby connecting one side of the dome light 52 to the negative side of the battery 25. The opposite side of the light is permanently connected to the positive side of the battery 25.

It will be apparent that whether the dome light 52 is burnt out or in good shape, the circuit will operate in the proper sequence. However, it is to be noted that an added attraction of this circuit is that if the doors are opened closing switch 53 when the circuit is in its alert condition, terminal 43 of relay 1 will be connected to the negative side of battery 25 through lead 49 and the alarm system will operate in the same manner as if terminal 43 had been connected to the negative side of the battery due to the contact between the ring 16 and wire 17.

Figure 2:
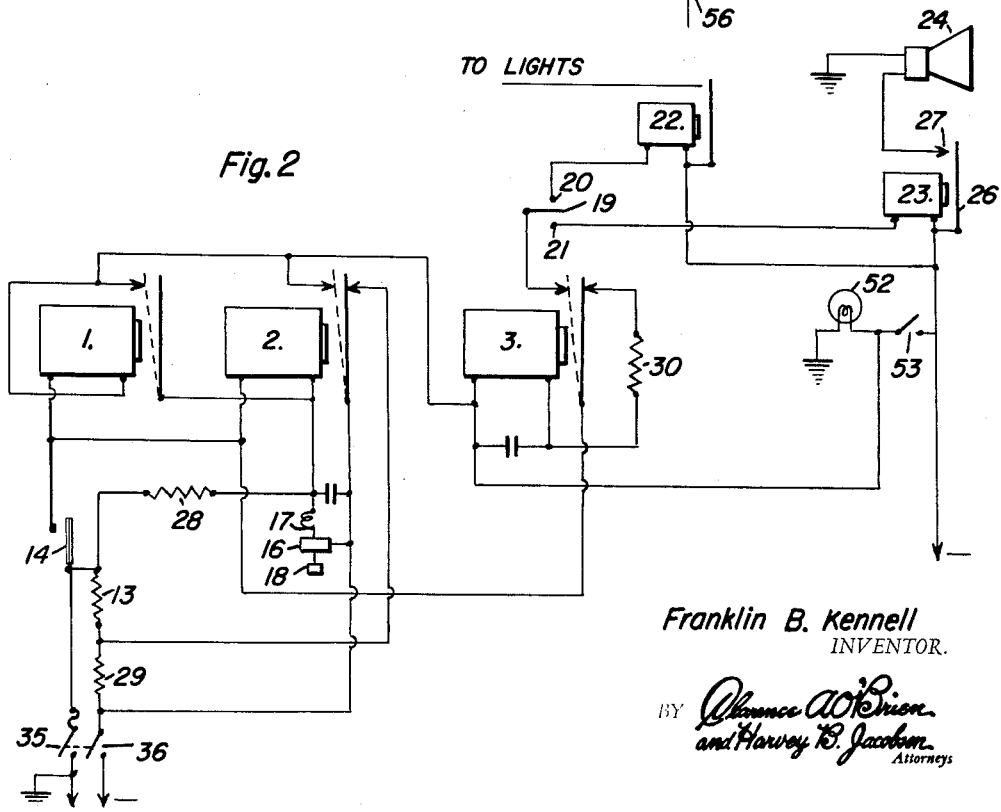
Figure 2 is a second embodiment of the invention utilizing a slightly different electrical circuit for use with a second type of automobile circuitry.

Figure 2 shows a circuit utilizing the identical principles as the circuit of Figure 1. The only significant difference in this circuit is in the placement of the dome light 52 which is shown in Figure 2 connected directly to ground. The circuit of Figure 2 is intended to be used in cars utilizing a positive ground.

Figure 3 is a circuit using one relay of the double-pole type and also utilizing two thermal relays or switches. The thermal switch consisting of heating element 3, bi-metallic strip 12 and contact 6 corresponds in function to the relay 3, resistor 30 and capacitor 32 of the embodiment of Figure 1. The operation of this embodiment is as follows: One side of heating element 3 connects through conductor 54, conductor 37 to the positive side of battery 25. When the alarm device has been active by the sensitive action of ring 16 and wire 17, the relay 2 will close in accordance with the principles recited above. The other side of heating element 3 returns through contact 12 (normally closed), contact 11 and armature 5 to the negative side of battery 25. A heating effect takes place in heating element 3. During this heating process, relay 23 becomes actuated so as to operate warning devices such as a horn or lights. After a predetermined interval, the heating element 3 will cause the bi-metallic strip 12 and contact 6 to open and thereby deenergize relay 23 so as to cease the activation of the warning devices, at the same time opening the circuit of heating element 3 causing it and the bi-metallic strip 12 to cool again closing the contacts 12 and 6.

It is evident that the polarity of the battery connections to the above described systems is of no importance as none of the electrical components of said systems is polarity sensitive. Where positive and negative has been used in the description they are used solely as an aid in describing the circuitry.

As a necessary and integral part of the burglar alarm system of this invention, an acceleration sensitive switch is shown in Figures 4 and 5 including a non-conductive cylinder 104 which is fitted onto the collar 105 of a metal base plate 101. The cylinder is closed at the top with an insulative cap 106. Within the cylinder 104 is a bowl section 102 which forms a portion of the metal base 101. Resting in the bowl section 102 is a metal ball 107. Against the sides of cylinder 104 is a metal band 103 which is in permanent contact with a metal gimbal pin 108 but not in contact with the metallic pin 109 on the opposite side and placed above and not in contact with the metal base 101. The metal pin 109 is connected permanently through conductor 121 to the metal base 101, the cylinder 104 is mounted on the gimbal ring 110 which is also constructed of an electrically insulative material. As is seen in Figure 5 this mounting consists of the gimbal pins 108 and 109 which pass through holes 113 in the gimbal ring 110. The ends of the pins 108 and 109 are supported by the springs 114 and 115.

The ring 110 is mounted on the insulating support 118 by the pins 111 and 112 which pass through holes in the ring 110. Pins 111 and 112 are supported by springs 119 and 120 respectively. Springs 114 and 119 are electrically connected together by rivet 122 and springs 115 and 120 are electrically connected together by rivet 123. Terminals 116 and 117 are to be utilized as the ring 16 and the wire 17 described in Figure 1. The insulating support 118 is fastened to the inside of the housing containing the whole of the burglar alarm system, which is subsequently fastened to the car body.

It can now be seen that the cylinder 104, by means of the pin mountings 108 and 109, can swing through a complete 360° as the ring 110 is large enough for it to pass through in any position. Also the ring 110 due to pin mountings 111 and 112 can swing also in a 360° turn within insulating support 118. The cylinder 104 is then mounted in a gimbal support and regardless of the position of the insulating support 118, the cylinder 104 always remains in a vertical position. The metal base 101 with the ball 107 resting in the center of the bowl portion 102 will not make contact with the ring 103 in the absence of any acceleration. Regardless of the position or angle of the vehicle when marked, the cylinder 104 will always remain vertical. When the car is slightly moved, the metal ball 107 will roll in the bowl 102 to one side or another and momentarily make contact with the metal ring 103 thereby discharging the capacitor 31 as explained above.

In Figure 6, an acceleration sensitive switch similar to the switch of Figure 5 is shown. However, this switch features a novel adjustable element. A metal ring 133 is circumferentially supported in an insulated cylinder 136. The center circumference of the ring 133 is cut at an angle so that the cross-sectional area of the center of the ring varies according to the depth of the ring. A metallic body 137 is suspended by a wire 138 and is electrically connected through conductor 139 to an outer terminal 140 not shown. An acceleration or disturbance of this structure will cause the swinging movement of the metallic body 137. The resulting contact between 137 and ring 133 will complete a circuit from 140 to another external terminal 141.

The wire 138 is attached to a threaded screw 142 which cooperates with a nut 143 on the upper surface of the cylinder 136. An adjustment of the screw 142 will alter the relative height of the metallic body 137. Since the hole in the center of the metallic ring 133 varies according to the depth, a greater or lesser swinging movement will be necessary to bring the body 137 in contact with the ring 133. Therefore, it is apparent that the burglar alarm system may be adjusted according to the conditions desired.

In summary therefore what has been described includes a burglar alarm system featuring the following characteristics: (1) a time-delay circuit for allowing the operator and passenger time to leave the vehicle without setting off the alarm while doing so (2) a circuit by which the alarm after passing of the time-delay interval sets the alarm device to an alert status, ready to detect any interference with the automobile (3) an acceleration sensitive circuit which will send the alarm into action immediately should the car be tampered with (4) a circuit which will shut down or stop alarm from sounding after a preselected interval of time (5) a circuit which, after the alarm has stopped, automatically cause the alarm to be reset or taken back to its original alert condition ready to detect any further interference of the vehicle and (6) a means of turning the alarm device off with the car key for entering so as not to set the alarm into action while doing so.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A burglar alarm circuit for protecting a parked automobile comprising a capacitor electrically connected across an automobile battery for charging said capacitor, a heating element electrically connected in parallel with said capacitor, a bimetallic strip located proximate said heating element and carrying a movable contact thereon, a stationary contact, said contacts being normally open but adapted to close in response to a predetermined heat of said element, said stationary contact electrically connected to a series of relays, acceleration sensitive switch means electrically connected across said capacitor for shunting out said charged capacitor in response to an acceleration of any portion of said automobile, said relays further connected to said capacitor so that they are triggered upon the discharge of said capacitor, and a warning device electrically connected to said relays for producing an audible or visual warning.

2. A protective alarm circuit for an automobile including a battery having a pair of terminals comprising a first electrical path including a capacitor electrically connected across said battery, a second electrical path including a heating element electrically connected in parallel with said first path, a heat responsive switch responsive to said heating element having a contact connected to a first of said battery terminals, a first relay coil having a pair of terminals, said first relay coil having a first terminal connected to said heat responsive switch whereby said switch electrically connects the first terminal of said first relay coil to one of said battery terminals when said heat responsive switch closes, a second relay coil having a pair of terminals, said second relay coil having a first terminal connected to said first terminal on said first relay coil, a first movable armature movable between two different positions responsive to said first relay coil, a first fixed contact positioned to be conneced to said first movable armature in one of said two different positions, said first fixed contact connected to a second terminal of said first coil, said first movable armature connected to a second terminal of said second coil, a normally open acceleration sensitive switch electrically interposed between said second terminal of said second coil and a second of said battery terminals, said capacitor connected across said normally open acceleration sensitive switch and alarm means connected between said first and second terminals of said first relay coil for becoming actuated when said normally open acceleration sensitive switch closes, a second movable armature movable between two different positions responsive to said second relay coil, second and third fixed contacts positioned to be connected to said second movable armature respectively in each of said two different positions of said second movable armature, said second fixed contact connected to second terminal of said first relay coil, said third fixed contact connected in series with said heating element in said second electrical path, said second movable armature connected to a second of said battery terminals.

3. A protective alarm circuit for an automobile including a battery having a pair of terminals comprising a first electrical path including a capacitor electrically connected across said battery, a second electrical path including a heating element electrically connected in parallel with said first path, a heat responsive switch responsive to said heating element having a contact connected to a first of said battery terminals, a first relay coil having a pair of terminals, said first relay coil having a first terminal connected to said heat responsive switch whereby said switch electrically connects the first terminal of said first relay coil to one of said battery terminals when said heat responsive switch closes, a second relay coil having a pair of terminals, said second relay coil having a first terminal connected to said first terminal on said first relay coil, a first movable armature movable between two different positions responsive to said first relay coil, a first fixed contact positioned to be connected to said first movable armature in one of said two different positions, said first fixed contact connected to a second terminal of said first coil, said first movable armature connected to a second terminal of said second coil, a normally open acceleration sensitive switch electrically interposed between said second terminal of said second coil and a second of said battery terminals, said capacitor connected across said normally open acceleration sensitive switch and alarm means connected between said first and second terminals of said first relay coil for becoming actuated when said normally open acceleration sensitive switch closes, a second movable armature movable between two different positions responsive to said second relay coil, second and third fixed contacts positioned to be connected to said second movable armature respectively in each of said two different positions of said second movable armature, said second fixed contact connected to said second terminal of said first relay coil, said third fixed contact connected in series with said heating element in said second electrical path, said second movable armature connected to a second of said battery terminals, a resistor electrically connected between said third fixed contact and said second movable armature.

4. A protective alarm circuit for an automobile including a battery having a pair of terminals comprising a first electrical path including a capacitor electrically connected across said battery, a second electrical path including a heating element electrically connected in parallel with said first path, a heat responsive switch responsive to said heating element having a contact connected to a first of said battery terminals, a first relay coil having a pair of terminals, said first relay coil having a first terminal connected to said heat responsive switch whereby said switch electrically connects the first terminal of said first relay coil to one of said battery terminals when said heat responsive switch closes, a second relay coil having a pair of terminals, said second relay coil having a first terminal connected to said first terminal on said first relay coil, a first movable armature movable between two different positions responsive to said first relay coil, a first fixed contact positioned to be connected to said first movable armature in one of said two different positions, said first fixed contact connected to a second terminal of said first coil, said first movable armature connected to a second terminal of said second coil, a normally open acceleration sensitive switch electrically interposed between said second terminal of said second coil and a second of said battery terminals, said capacitor connected across said normally open acceleration sensitive switch and alarm means connected between said first and second terminals of said first relay coil for becoming actuated when said normally open acceleration sensitive switch closes, a second movable armature movable between two different positions responsive to said second relay coil, second and third fixed contacts positioned to be connected to said second movable armature responsively in each of said two different positions of said second movable armature, said second fixed contact connected to said second terminal of said first relay coil, said third fixed contact connected in series with said heating element in said second electrical path, said second movable armature connected to a second of said battery terminals, a resistor electrically connected between said third fixed contact and said second movable armature, said alarm means including a third relay coil having a pair of terminals, a third movable armature movable between two different positions responsive to said third relay coil, fourth and fifth fixed contacts positioned to be connected to said third movable armature respectively in each of said two different positions of said third movable armature, a first terminal of said third relay coil connected to said first terminal of said first relay coil, a second capacitor, said second capacitor connected between said first terminal on said third relay coil and a second terminal on said third relay coil, said fifth fixed contact connected to said second terminal on said third relay coil, said third movable armature connected to said second terminal of said battery, an alarm device, said alarm device connected to said fourth fixed contact.

5. A burglar alarm circuit for protecting a parked automobile comprising a capacitor electrically connected across an automobile battery for charging said capacitor, a heating element electrically connected in parallel with said capacitor, a bimetallic strip located proximate said heating element and carrying a movable contact thereon, a stationary contact, said contacts being normally open but adapted to close in response to a predetermined heat of said element, said stationary contact electrically connected to a series of relays, acceleration sensitive switch means electrically connected across said capacitor for shunting out said charged capacitor in response to an acceleration of any portion of said automobile, said relays further connected to said capacitor so that they are triggered upon the discharge of said capacitor, and a warning device electrically connected to said relays for producing an audible or visual warning, said switch means including an electrically insulative cylinder, a freely suspended electrically conductive body within said cylinder, said cylinder having an aperture therein, an electric conductor passing through said aperture and terminating in an electrically conductive collar within said cylinder surrounding and normally spaced from said body, a second electrical conductor, said second conductor connected to said freely suspended body whereby a slight acceleration of said switch will cause said body to contact said collar completing a path between said conductors.

6. A burglar alarm circuit for protecting a parked automobile comprising a capacitor electrically connected across an automobile battery for charging said capacitor, a heating element electrically connected in parallel with said capacitor, a bimetallic strip located proximate said heating element and carrying a movable contact thereon, a stationary contact, said contacts being normally open but adapted to close in response to a predetermined heat of said element, said stationary contact electrically connected to a series of relays, acceleration sensitive switch means electrically connected across said capacitor for shunting out said charged capacitor in response to an acceleration of any portion of said automobile, said relays further connected to said capacitor so that they are triggered upon the discharge of said capacitor, and a warning device electrically connected to said relays for producing an audible or visual warning, said automobile defining a plurality of doors, door switches mounted in said automobile and operatively associated with door locking means, said door switches electrically connected to said battery whereby unlocking of said doors will open said door switches to deactivate said alarm circuit.

7. A burglar alarm circuit for protecting a parked automobile comprising a capacitor electrically connected across an automobile battery for charging said capacitor, a heating element electrically connected in parallel with said capacitor, a bimetallic strip located proximate said heating element and carrying a movable contact thereon, a stationary contact, said contacts being normally open but adapted to close in response to a predetermined heat of said element, said stationary contact electrically connected to a series of relays, acceleration sensitive switch means electrically connected across said capacitor for shunting out said charged capacitor in response to an acceleration of any portion of said automobile, said relays further connected to said capacitor so that they are triggered upon the discharge of said capacitor, and a warning device electrically connected to said relays for producing an audible or visual warning, means connected to said warning device causing intermittent energization thereof.

8. A burglar alarm circuit for protecting a parked automobile comprising a capacitor electrically connected across an automobile battery for charging said capacitor, a heating element electrically connected in parallel with said capacitor, a bimetallic strip located proximate said heating element and carrying a movable contact thereon, a stationary contact, said contacts being normally open but adapted to close in response to a predetermined heat of said element, said stationary contact electrically connected to a series of relays, acceleration sensitive switch means electrically connected across said capacitor for shunting out said charged capacitor in response to an acceleration of any portion of said automobile, said relays further connected to said capacitor so that they are triggered upon the discharge of said capacitor, and a warning device electrically connected to said relays for producing an audible or visual warning, and circuit means permitting the cooling of said heating element a predetermined time after said capacitor triggering whereby said alarm circuit may be returned to pre-triggering circuit conditions.

References Cited in the file of this patent

UNITED STATES PATENTS

| | | |
|---|---|---|
| 1,178,719 | Hildebrand | Apr. 11, 1916 |
| 1,205,271 | Safford | Nov. 21, 1916 |
| 1,241,888 | Safford | Oct. 2, 1917 |
| 1,754,360 | Hendricks | Apr. 15, 1930 |
| 1,805,147 | Murray | May 12, 1931 |
| 1,844,338 | Rupert | Feb. 9, 1932 |
| 1,870,347 | Roberts | Aug. 9, 1932 |
| 1,902,578 | Parsons | Mar. 21, 1933 |
| 2,292,252 | Thommen | Aug. 4, 1942 |
| 2,448,681 | Nutter | Sept. 7, 1948 |
| 2,618,712 | Maledzky | Nov. 18, 1952 |
| 2,652,552 | Hueso | Sept. 15, 1953 |
| 2,695,676 | Wettengel | Nov. 30, 1954 |
| 2,892,181 | Benson et al. | June 23, 1959 |